(12) United States Patent
Nishida et al.

(10) Patent No.: US 12,460,693 B2
(45) Date of Patent: Nov. 4, 2025

(54) SEALING DEVICE AND DRIVE APPARATUS INCLUDING THE SAME

(71) Applicant: MITSUBISHI HEAVY INDUSTRIES, LTD., Tokyo (JP)

(72) Inventors: Shingo Nishida, Tokyo (JP); Ryoichi Kawakami, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 696 days.

(21) Appl. No.: 17/312,065

(22) PCT Filed: Jan. 11, 2019

(86) PCT No.: PCT/JP2019/000656
§ 371 (c)(1),
(2) Date: Jun. 9, 2021

(87) PCT Pub. No.: WO2020/144840
PCT Pub. Date: Jul. 16, 2020

(65) Prior Publication Data
US 2022/0025950 A1    Jan. 27, 2022

(51) Int. Cl.
*F16F 9/04*     (2006.01)
*F16F 9/36*     (2006.01)
(Continued)

(52) U.S. Cl.
CPC .............. *F16F 9/04* (2013.01); *F16F 9/361* (2013.01); *F16J 3/041* (2013.01); *F16J 3/06* (2013.01); *F16J 15/52* (2013.01)

(58) Field of Classification Search
CPC .. F16F 9/04; F16F 9/0472; F16F 9/055; F16F 9/084; F16F 9/088; F16F 9/08; F16F 9/361; F16J 3/041; F16J 3/06; F16J 15/05
See application file for complete search history.

(56) References Cited

U.S. PATENT DOCUMENTS 4,360,499 A * 11/1982 Gubitose ................. C30B 15/30
                                                    117/211
4,572,488 A *  2/1986 Holmberg, Jr. ........... F16F 9/52
                                                    267/221
(Continued)

FOREIGN PATENT DOCUMENTS

JP    S58-109774 A    6/1983
JP    H01-165305 U   11/1989
(Continued)

OTHER PUBLICATIONS

DE 102017220581 A1 (Year: 2018).*
(Continued)

*Primary Examiner* — Robert A. Siconolfi
*Assistant Examiner* — Mahbubur Rashid
(74) *Attorney, Agent, or Firm* — WHDA, LLP

(57) ABSTRACT

A sealing device includes a movable part which is fixed to a shaft penetrating a wall of a vessel and is movable with the shaft, the vessel being configured to include an interior space, a first bellows part which has a first end fixed to the vessel and a second end fixed to the movable part, for sealing a penetrated portion of the vessel by the shaft, a second bellows part which is disposed opposite to the first bellows part across the movable part, and has a first end disposed on a side of the first bellows part and fixed to the movable part, and a second end fixed to a stationary member, and a communication path for causing an interior space of the first bellows part and an interior space of the second bellows part to communicate with each other.

2 Claims, 11 Drawing Sheets

(51) Int. Cl.
*F16J 3/04* (2006.01)
*F16J 3/06* (2006.01)
*F16J 15/52* (2006.01)

(56) References Cited

U.S. PATENT DOCUMENTS

| | | | |
|---|---|---|---|
| 4,815,574 A | 3/1989 | Taylor et al. | |
| 4,856,626 A * | 8/1989 | Nakanishi | F16F 9/0481 |
| | | | 267/152 |
| 4,890,822 A * | 1/1990 | Ezure | F16F 9/096 |
| | | | 92/48 |
| 5,266,119 A | 11/1993 | Taniguchi et al. | |
| 5,346,513 A | 9/1994 | Taniguchi et al. | |
| 5,784,925 A * | 7/1998 | Trost | G03F 7/70816 |
| | | | 277/318 |
| 5,899,653 A * | 5/1999 | Brodine | H01L 21/67748 |
| | | | 414/222.04 |
| 6,216,831 B1 * | 4/2001 | Taylor | F16F 9/3207 |
| | | | 188/312 |
| 6,390,254 B1 * | 5/2002 | Bennett | F16F 9/20 |
| | | | 188/282.3 |
| 6,621,556 B2 * | 9/2003 | Iwasaki | G03F 7/70066 |
| | | | 355/72 |
| 6,660,089 B2 * | 12/2003 | Nozawa | C23C 14/505 |
| | | | 118/500 |
| 6,923,434 B2 * | 8/2005 | Schisler | F16F 9/05 |
| | | | 267/64.19 |
| 8,623,172 B2 * | 1/2014 | Hayashi | H01J 37/32568 |
| | | | 156/345.47 |
| 9,759,485 B2 * | 9/2017 | Ito | F26B 5/065 |
| 10,457,386 B2 * | 10/2019 | Luce | B64C 25/505 |
| 2015/0226282 A1 | 8/2015 | Hindle et al. | |
| 2020/0152406 A1 * | 5/2020 | Ebelsberger | F16F 9/04 |

FOREIGN PATENT DOCUMENTS

| | | |
|---|---|---|
| JP | H04-336412 A | 11/1992 |
| JP | H06-163668 A | 6/1994 |
| JP | H06-280741 A | 10/1994 |
| JP | 2004-214527 A | 7/2004 |
| JP | 2011-137644 A | 7/2011 |
| JP | 2015-152171 A | 8/2015 |

OTHER PUBLICATIONS

WO 2018229096 A1 (Year: 2018).*
DE 202017007180 U1 (Year: 2019).*
DE 102017220578 A1 (Dec. 2018) (Year: 2018).*
The Extended European Search Report dated Nov. 22, 2021, issued to the counterpart EP application No. 19908458.3. (8 pages).
International Search Report dated Mar. 5, 2019, issued in counterpart International application No. PCT/JP2019/000656. (11 pages).
Notification of Transmittal of Translation of the International Preliminary Report on Patentability (Form PCT/IB/338) issued in counterpart International application No. PCT/JP2019/000656 mailed Jul. 22, 2021 with Forms PCT/IB/373 and PCT/ISA/237, with English translation. (19 pages).
Office Action dated Jun. 21, 2022 issued in counterpart JP application No. 2020-565129, with English translation. (23 pages).

* cited by examiner

SEALING DEVICE AND DRIVE APPARATUS INCLUDING THE SAME

TECHNICAL FIELD

The present disclosure relates to a sealing device and a drive apparatus including the same.

BACKGROUND

As a sealing device for sealing a penetrated portion of a vessel by a shaft where a pressure difference between inside and outside is large, such as a high-pressure vessel, a bellows may be used to seal the above-described penetrated portion while allowing an axial movement of the shaft.

For example, Patent Document 1 discloses a fluid force measurement device for vibrating a fluid measurement part disposed in a high-pressure vessel via a vibration shaft penetrating a wall of the high-pressure vessel, by using a vibrator disposed outside the high-pressure vessel. In the concerned device, a seal part formed by a metal bellows is used to suppress leakage of a fluid in the penetrated portion of the high-pressure vessel by the vibration shaft. The seal part includes an outer bellows and an inner bellows each having one end fixed to the vessel and another end fixed to a flange part disposed on the vibration shaft. A high-pressure gas is introduced to an annular sealing space formed between the outer bellows and the inner bellows, and a pressure in the sealing space is regulated by a control device such that a force applied to the above-described flange part is canceled by a pressure in the vessel.

CITATION LIST

Patent Literature

Patent Document 1: JP2011-137644A

SUMMARY

Technical Problem

In the device of Patent Document 1, since the bellows is used as the seal part for sealing the penetrated portion of the vessel by the shaft (vibration shaft), it is possible to seal the shaft penetrating portion while allowing driving of the shaft, and to reduce a driving force necessary for vibration by canceling the force applied to the shaft due to the pressure in the vessel with the pressure of the sealing space. However, in order to appropriately cancel the force applied to the shaft due to the pressure in the vessel, it is necessary to regulate the pressure in the sealing space in accordance with a pressure fluctuation in the vessel due to displacement of the shaft or other causes in vibration, complicating the structure of the sealing device and control of the pressure.

In view of the above issues, an object of at least one embodiment of the present invention is to provide the sealing device capable of appropriately driving the shaft while reducing the driving force to the shaft and the drive apparatus including the same.

Solution to Problem (1) A sealing device according to at least some embodiments of the present invention includes a movable part which is fixed to a shaft penetrating a wall of a vessel and is movable with the shaft, the vessel being configured to include an interior space having a higher pressure or a lower pressure than an exterior space, a first bellows part which has a first end fixed to the vessel and a second end fixed to the movable part, for sealing a penetrated portion of the vessel by the shaft, a second bellows part which is disposed opposite to the first bellows part across the movable part, and has a first end disposed on a side of the first bellows part and fixed to the movable part, and a second end fixed to a stationary member, and a communication path for causing an interior space of the first bellows part and an interior space of the second bellows part to communicate with each other.

In the above configuration (1), the total length of the bellows including the second bellows part and the first bellows part for sealing the penetrated portion of the vessel by the shaft is constrained by fixing the both ends (the first end of the first the first bellows part and the second end of the second bellows part) of the bellows to the vessel and the stationary member, as well as the above-described movable part is disposed between the first bellows part and the second bellows part, and the interior space of the first bellows part and the interior space of the second bellows part are caused to communicate with each other. Thus, it is possible to suppress a pressure fluctuation in the vessel due to movement of the shaft and the movable part in the axial direction, and to cause the pressure of the same magnitude to act on the both surfaces (the surface on the side of the first bellows part and the surface on the side of the second bellows part) of the movable part. Therefore, it is possible to at least partially cancel the force of pushing the shaft (for example, the force of pushing the shaft out of the interior space of the high-pressure vessel toward the lower-pressure exterior space) by the differential pressure between the interior space and the exterior space of the vessel, and when the shaft is moved, it is possible to maintain the difference in magnitude between the forces acting on the both surfaces of the movable part small and constant without actively controlling the pressure.

Thus, according to the above configuration (1), with the simple configuration, it is possible to suppress displacement of the shaft (such as pushing-out of the shaft) due to the differential pressure described above while reliably sealing the shaft penetrating portion, and to appropriately drive the shaft while reducing the driving force to the shaft.

(2) In some embodiments, in the above configuration (1), a pressure-receiving area of the movable part in the interior space of the first bellows part and a pressure-receiving area of the movable part in the interior space of the second bellows part are equal to each other.

With the above configuration (2), since the pressure-receiving areas on the both sides (that is, the side of the first bellows part and the side of the second bellows part) of the movable part are equal to each other, it is possible to cancel the force of pushing the shaft by the differential pressure between the interior space and the exterior space of the vessel more reliably, and even if the shaft (and the movable part) is moved, it is possible to eliminate the difference in magnitude between the forces acting on the both surfaces of the movable part without actively controlling the pressure. Thus, according to the above configuration (2), with the simple configuration, it is possible to suppress displacement of the shaft (such as pushing-out of the shaft) due to the differential pressure described above more effectively, and to appropriately drive the shaft while reducing the driving force to the shaft.

(3) In some embodiments, in the above configuration (1) or (2), the shaft includes a first shaft part penetrating the wall of the vessel and connected to the movable part, and a second shaft part disposed opposite to the first shaft part across the movable part, the sealing device is configured such that a driving force in an axial direction is applied to one of the first shaft part or the second shaft part, and the sealing device is configured such that the driving force from the one of the first shaft part or the second shaft part is transmitted via the movable part to the other of the first shaft part or the second shaft part.

With the above configuration (3), since the first shaft part and the second shaft part constituting the shaft are, respectively, disposed on the both sides of the movable part, and the driving force in the axial direction is transmitted via the movable part from the one to the other of the first shaft part or the second shaft part, it is possible to appropriately drive the shaft while achieving the effect described in the above configuration (1), by appropriately applying the driving force to the one of the first shaft part or the second shaft part.

(4) In some embodiments, in the above configuration (3), the sealing device further includes a link which extends beyond the second bellows part in the axial direction, is connected at one end to the movable part, and is connected at another end to the second shaft part. The sealing device is configured such that the driving force applied to the one of the first shaft part or the second shaft part is transmitted via the link to the other of the first shaft part or the second shaft part.

With the above configuration (4), since the movable part and the second shaft part are connected via the link, it is possible to appropriately drive the shaft via the movable part by applying the driving force to the first shaft part or the second shaft part. Moreover, since the first shaft part and the second shaft part are, respectively, disposed on both sides of the link extending beyond the second bellows part in the axial direction, the shaft does not exist in the extension region of the second bellows part in the axial direction. Thus, it is possible to simplify the structure of the second bellows part. Accordingly, it is possible to easily adjust the pressure-receiving area of the movable part on the side of the second bellows part.

(5) In some embodiments, in the above configuration (3), the second shaft part is connected to the movable part on a side opposite to the first shaft part, the second bellows part includes an inner bellows part disposed on a radially outer side of the second shaft part, and an outer bellows part disposed on a radially outer side of the inner bellows part, and the interior space of the second bellows part is an annular space formed between the inner bellows part and the outer bellows part.

With the above configuration (5), since the second bellows part has the double bellows structure including the inner bellows part and the outer bellows part, it is possible to directly connect the second shaft part to the movable part on the inner side of the double bellows structure. Thus, it is possible to connect the first shaft part and the second shaft part to the both sides (the side of the first bellows part and the side of the second bellows side) of the movable part, respectively, and an intermediate member such as the link described in the above configuration (4) need not be provided, making it possible to simplify the structure of the sealing device. Moreover, since the first shaft part and the second shaft part are connected via the movable part, it is possible to appropriately drive the shaft by applying the driving force to the first shaft part or the second shaft part.

(6) In some embodiments, in any one of the above configurations (1) to (5), the communication path includes a communication pipe for connecting the interior space of the second bellows part and a space communicating with the first bellows part, via outside of the first bellows part and the second bellows part.

With the above configuration (6), since the interior space of the second bellows part and the space communicating with the first bellows part are connected by the communication pipe, it is possible to appropriately cause the interior space of the first bellows part and the interior space of the second bellows part to communicate with each other.

(7) In some embodiments, in any one of the above configurations (1) to (5), the communication path includes a through hole which is disposed in the movable part, and has one end opening to the interior space of the first bellows part and another end opening to the interior space of the second bellows part.

According to the above configuration (7), with the simple configuration where the above-described through hole is disposed in the movable part, it is possible to appropriately cause the interior space of the first bellows part and the interior space of the second bellows part to communicate with each other.

(8) In some embodiments, in any one of the above configurations (1) to (7), the interior space of the first bellows part communicates with the interior space of the vessel.

With the above configuration (8), since the first bellows part, the second bellows part, and the movable part are disposed on the outer side of the vessel, assembly of the sealing device to the vessel or maintenance of the sealing device is relatively easy.

(9) In some embodiments, in any one of the above configurations (1) to (7), the interior space of the first bellows part communicates with the exterior space of the vessel.

With the above configuration (9), since the first bellows part, the second bellows part, and the movable part are disposed on the inner side of the vessel, it is possible to save an installation space of the sealing device.

(10) A sealing device according to at least some embodiments of the present invention includes a movable part which is fixed to a shaft penetrating a wall of a vessel and is movable with the shaft, the vessel being configured to include an interior space having a higher pressure or a lower pressure than an exterior space, a first bellows part which has a stationary-side end fixed to the vessel and a movable-side end fixed to the movable part, and a second bellows part which is disposed in series with the first bellows part in an axial direction, and has a stationary-side end fixed to a stationary member and a movable-side end fixed to the movable part. Among the stationary-side end and the movable-side end of the first bellows part and the stationary-side end and the movable-side end of the second bellows part, a distance in the axial direction between the stationary-side ends or between the movable-side ends located farthest from each other in the axial direction is constant regardless of a position of the shaft. An interior space of the first bellows part and an interior space of the second bellows part communicate with each other.

In the above configuration (10), the axial distance between the both ends (between the stationary-side ends or between the movable-side ends farthest from each other) of the bellows including the first bellows part and the second bellows part is constant, as well as one end portion of each of the first bellows part and the second bellows part is fixed to the stationary part (such as the vessel), another end portion is fixed to the movable member, and the interior space of the first bellows part and the interior space of the second bellows part are caused to communicate with each other. Thus, it is possible to move the shaft without changing a total value of the axial length of the first bellows part and the axial length of the second bellows part, as described in the above configuration (1), making it possible to suppress the pressure fluctuation in the vessel due to movement of the shaft and the movable part in the axial direction, and to cause the pressure of the same magnitude to act on the surfaces of the movable part to which the first bellows part and the second bellows part are fixed. Therefore, it is possible to at least partially cancel the force of pushing the shaft (for example, the force of pushing the shaft out of the interior space of the high-pressure vessel toward the lower-pressure exterior space) by the differential pressure between the interior space and the exterior space of the vessel, and when the shaft is moved, it is possible to maintain the difference in magnitude between the forces acting on the both surfaces of the movable part small and constant without actively controlling the pressure.

Thus, according to the above configuration (10), with the simple configuration, it is possible to suppress displacement of the shaft (such as pushing-out of the shaft) due to the differential pressure described above while reliably sealing the shaft penetrating portion, and to appropriately drive the shaft while reducing the driving force to the shaft.

(11) In some embodiments, in the above configuration (10), the movable-side end of the first bellows part and the movable-side end of the second bellows part are fixed to a same member serving as the movable part.

With the above configuration (11), as described in the above configurations (1) to (9), with the simple configuration, it is possible to suppress displacement of the shaft (such as pushing-out of the shaft) due to the differential pressure described above while reliably sealing the shaft penetrating portion, and to appropriately drive the shaft while reducing the driving force to the shaft.

(12) In some embodiments, in the above configuration (10), the shaft penetrates the wall of the vessel in a plurality of portions including a first penetrated portion and a second penetrated portion, the movable part includes a first movable member and a second movable member fixed to the shaft at positions on both sides across the vessel in the axial direction, respectively, the stationary-side end of the first bellows part is fixed to the vessel in the first penetrated portion, and the movable-side end of the first bellows part is fixed to the first movable member, and the stationary-side end of the second bellows part is fixed to the vessel in the second penetrated portion, and the movable-side end of the second bellows part is fixed to the second movable member.

According to the above configuration (12), in the case where the shaft penetrates the wall of the vessel in the plurality of portions including the first penetrated portion and the second penetrated portion, with the simple configuration, it is possible to suppress displacement of the shaft (such as pushing-out of the shaft) due to the differential pressure described above while reliably sealing the shaft penetrating portion including the first penetrated portion and the second penetrated portion, and to appropriately drive the shaft while reducing the driving force to the shaft.

(13) A drive apparatus according to at least some embodiments of the present invention includes a shaft which penetrates a wall of a vessel configured to include an interior space having a higher pressure or a lower pressure than an exterior space, the sealing device according to any one of the above configurations (1) to (12) configured to seal a penetrated portion of the vessel by the shaft, and a drive part configured to apply a driving force in an axial direction to the shaft via the sealing device.

In the above configuration (13), the total length of the bellows including the second bellows part and the first bellows part for sealing the penetrated portion of the vessel by the shaft is constrained by fixing the both ends of the bellows to the vessel and the stationary member, as well as the above-described movable part is disposed between the first bellows part and the second bellows part, and the interior space of the first bellows part and the interior space of the second bellows part are caused to communicate with each other. Thus, it is possible to suppress a pressure fluctuation in the vessel due to movement of the shaft and the movable part in the axial direction, and to cause the pressure of the same magnitude to act on the both surfaces of the movable part. Therefore, it is possible to at least partially cancel the force of pushing the shaft by the differential pressure between the interior space and the exterior space of the vessel, and when the shaft is moved, it is possible to maintain the difference in magnitude between the forces acting on the both surfaces of the movable part small and constant without actively controlling the pressure.

Thus, according to the above configuration (13), with the simple configuration, it is possible to suppress displacement of the shaft (such as pushing-out of the shaft) due to the differential pressure described above while reliably sealing the shaft penetrating portion, and to appropriately drive the shaft while reducing the driving force to the shaft.

Advantageous Effects

According to at least one embodiment of the present invention, in view of the above issues, the at least one embodiment of the present invention provides a sealing device capable of, with a simple configuration, appropriately driving a shaft while reducing a driving force to the shaft and a drive apparatus including the same.

DETAILED DESCRIPTION

Figure 1:
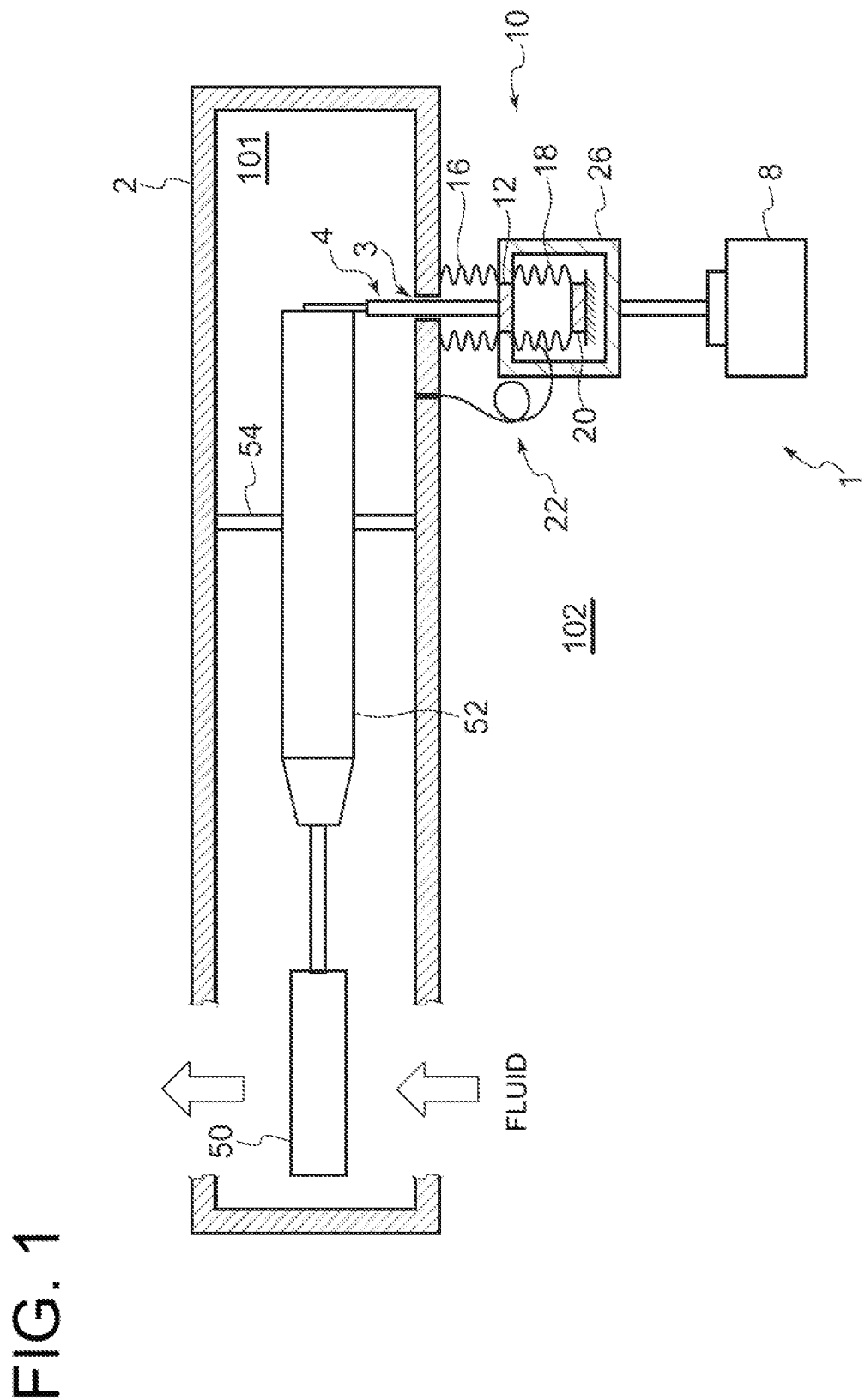
FIG. 1 is a schematic view of a drive apparatus according to an embodiment.

Some embodiments of the present invention will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present invention.

First, an example of a drive apparatus to which a sealing device is applied according to some embodiments will be described with reference to FIG. 1.

FIG. 1 is a schematic view of the drive apparatus according to an embodiment. A drive apparatus 1 shown in FIG. 1 is configured to vibrate a vibration object 50 disposed in a vessel 2. As shown in the drawing, the drive apparatus 1 includes a shaft 4 penetrating a wall of the vessel 2 (that is, a wall dividing an interior space 101 and an exterior space 102 of the vessel 2), and a drive part 8 for driving the shaft 4 in the axial direction.

The "axial direction" in the present specification means the axial direction of the shaft 4, unless particularly mentioned otherwise.

The vessel 2 is configured to include the interior space 101 having a higher pressure or a lower pressure than the exterior space 102. For example, the vessel 2 shown in FIG. 1 is installed at atmospheric pressure, and the interior space 101 of the vessel 2 is filled with a fluid having a pressure higher than the atmospheric pressure. That is, the vessel 2 shown in FIG. 1 is configured to include the interior space 101 having the higher pressure than the exterior space 102. In other embodiments, the vessel 2 may be configured to include the interior space 101 having the lower pressure than the exterior space 102.

The sealing device 10 is configured to seal a penetrated portion 3 of the vessel 2 by the shaft 4. The detailed configuration of the sealing device 10 will be described later.

The drive part 8 is configured to apply a driving force in the axial direction to the shaft 4. The drive part 8 may be, for example, a hydraulic actuator.

Between the vibration object 50 installed in the vessel 2 and the shaft 4 of the drive apparatus 1, a support rod 52 supported by the vessel 2 via a support part 54 is disposed. The support rod 52 has one end connected to the vibration object 50 and another end connected to the shaft 4. If the shaft 4 is driven in the axial direction by the drive part 8, the support rod 52 swings from the support part 54, swinging the vibration object 50 connected to the support part 54.

Thus swinging the vibration object 50 in the vessel 2, for example, by providing a sensor such as a load sensor as needed, it is possible to measure a force received from a fluid by the vibration object 50.

Hereinafter, the sealing device 10 according to some embodiments will be described in more detail. In some embodiments, the sealing device 10 is applicable to the above-described drive apparatus 1. The sealing device 10 to be described below is applied to the above-described drive apparatus 1.

FIGS. 2A to 10 are each a schematic view of the sealing device 10 according to an embodiment. FIG. 2B is a side view of the sealing device 10 in FIG. 2A.

As shown in FIGS. 2A to 10, the sealing device 10 includes a movable part 12 which is fixed to the shaft 4 penetrating the wall of the vessel 2, a first bellows part 16 for sealing the penetrated portion 3 (3A, 3B in FIG. 10) of the vessel 2 by the shaft 4, and a second bellows part 18.

The vessel 2 including the penetrated portion 3 by the shaft 4 is configured to include the interior space 101 having the higher pressure or the lower pressure than the exterior space 102, as described above. A pressure difference between the interior space 101 and the exterior space 102 of the vessel 2 may be, for example, not less than 1 MPa and not greater than 10 MPa.

The movable part 12 is fixed to the shaft 4 and is movable with the shaft 4. That is, when the shaft 4 is driven in the axial direction by the drive part 8 (see FIG. 1), the movable part 12 moves in the axial direction with the shaft 4.

First, with reference to FIGS. 2A and 2B, the sealing device 10 according to an embodiment will be described here.

Figure 2A:
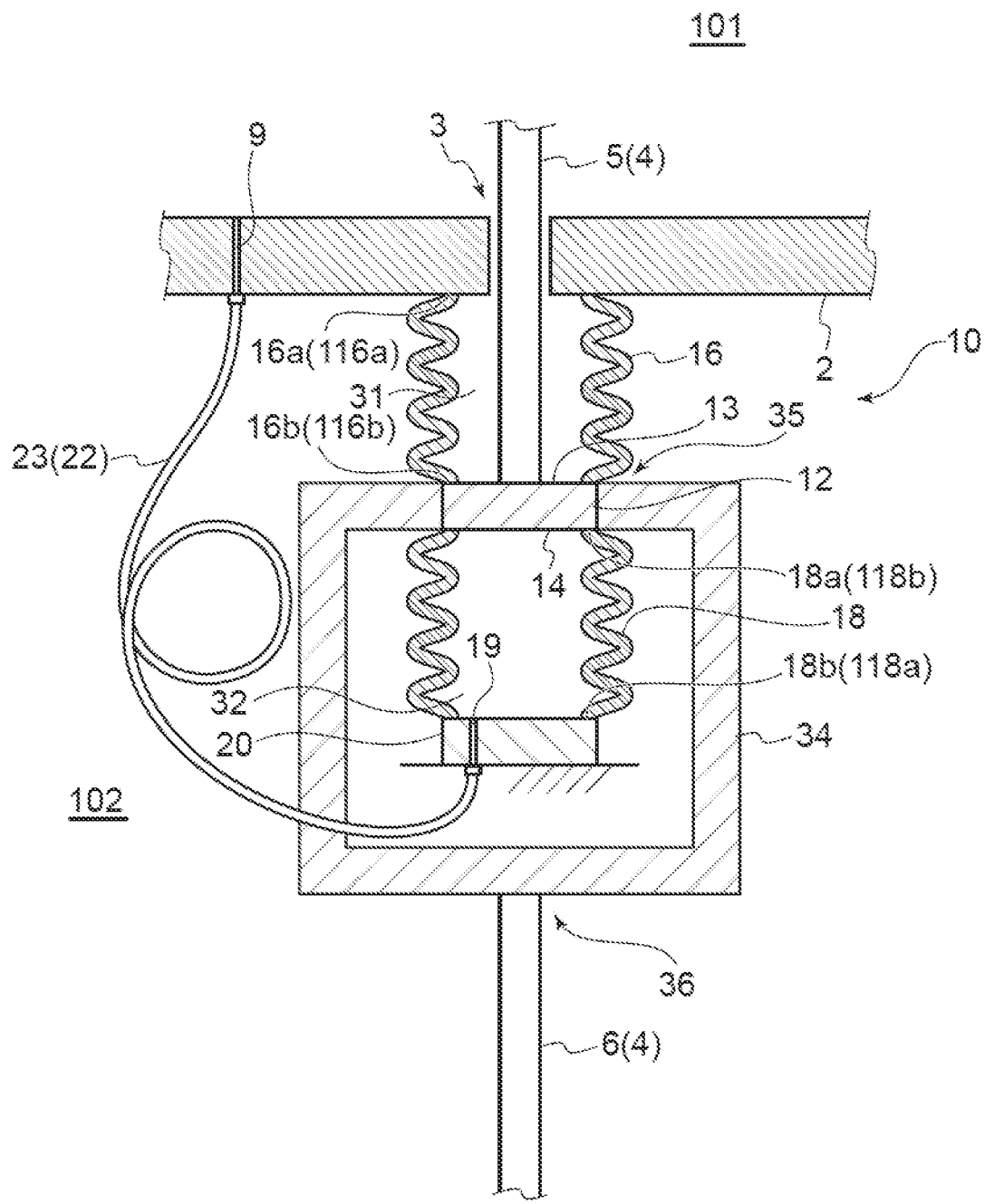
FIG. 2A is a schematic view of a sealing device according to an embodiment.
Figure 2B:
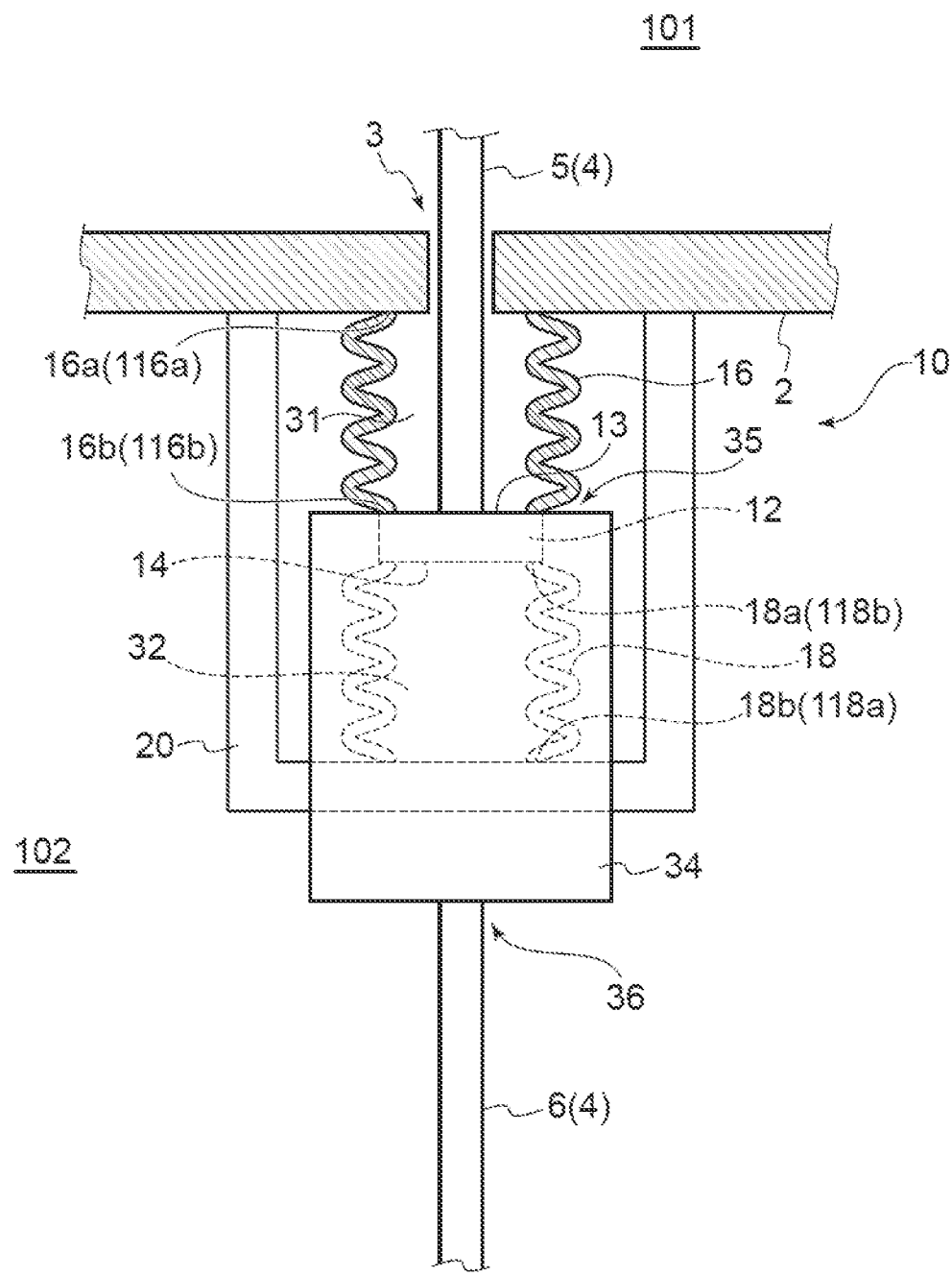
FIG. 2B is a schematic side view of the sealing device shown in FIG. 2A.

In the sealing device 10 shown in FIG. 2A, 2B, the shaft 4 includes a first shaft part 5 penetrating the wall of the vessel 2 and connected to the movable part 12, and a second shaft part 6 located opposite to the first shaft part 5 across the movable part 12. The movable part 12 of the sealing device 10 shown in FIG. 2A, 2B is fixed to one end of the first shaft part 5 penetrating the wall of the vessel 2 on the outer side of the vessel 2.

The first bellows part 16 has a first end 16a and a second end 16b. The first end 16a is disposed around the shaft 4 (more specifically, the first shaft part 5) between the vessel 2 and the movable part 12 in the axial direction, and the second end 16b is fixed to the movable part 12. The interior space 31 of the first bellows part 16 communicates with a space opposite to the first bellows part 16 across the penetrated portion 3 of the vessel 2 by the shaft 4, that is, the interior space 101 of the vessel 2.

The second bellows part 18 is disposed opposite to the first bellows part 16 across the movable part 12, and has a first end 18a and a second end 18b. The first end 18a is disposed on the side of the first bellows part 16 and fixed to the movable part 12, and the second end 18b is fixed to a stationary member 20. The stationary member 20 to which the second end 18b of the second bellows part 18 is fixed is not particularly limited, as long as the stationary member 20 is stationary with respect to the vessel 2. The stationary member 20 may be, for example, a member connected and fixed to an outer wall or the like of the vessel 2. In the present embodiment, as shown in FIG. 2B, the stationary member 20 is fixed to the vessel 2.

That is, the first end 16a of the first bellows part 16 and the second end 18b of the second bellows part 18 are fixed to the member stationary with respect to the vessel 2 (the vessel 2 or the member fixed thereto), and the second end 16b of the first bellows part 16 and the first end 18a of the second bellows part 18 are fixed to the movable part 12. Thus, while the total length of the bellows including the first bellows part 16 and the second bellows part 18 is unchanged (constant), the first bellows part 16 and the second bellows part 18 are expandable along the axial direction along with movement in the axial direction of the shaft 4 and the movable part 12.

In the embodiment shown in FIG. 2A, 2B, the second bellows part 18 has a single bellows structure, and an interior space 32 of the second bellows part 18 is a radially inner space of the second bellows part 18.

As shown in FIG. 2A, the interior space 31 of the first bellows part 16 and the interior space 32 of the second bellows part 18 communicate with each other via a communication pipe 23 serving as a communication path 22. FIG. 2B does not illustrate the communication pipe 23 (communication path 22).

Thus causing the interior space 31 of the first bellows part 16 and the interior space 32 of the second bellows part 18 to communicate with each other via the communication path 22, a pressure of the same magnitude is introduced to these interior spaces 31, 32. That is, the pressure of the same magnitude acts on, of the movable part 12, a surface 13 exposed to the interior space 31 of the first bellows part 16 and a surface 14 exposed to the interior space 32 of the second bellows part 18.

As described above, in the sealing device 10 shown in FIG. 2A, 2B, the total length of the bellows including the second bellows part 18 and the first bellows part 16 for sealing the penetrated portion 3 of the vessel 2 by the shaft 4 is constrained by fixing the both ends (the first end 16a of the first the first bellows part 16 and the second end 18b of the second bellows part 18) of the bellows to the vessel 2 and the stationary member 20, as well as the above-described movable part 12 is disposed between the first bellows part 16 and the second bellows part 18, and the interior space 31 of the first bellows part 16 and the interior space 32 of the second bellows part 18 are caused to communicate with each other.

With the above configuration, it is possible to suppress a pressure fluctuation in the vessel 2 due to movement of the shaft 4 and the movable part 12 in the axial direction, and to cause the pressure of the same magnitude to act on the both surfaces (the surface 13 exposed to the interior space 31 of the first bellows part 16 and the surface 14 exposed to the interior space 32 of the second bellows part 18) of the movable part 12. Therefore, it is possible to at least partially cancel a force of pushing the shaft 4 by a differential pressure between the interior space 101 and the exterior space 102 of the vessel 2.

In the case of the sealing device 10 shown in FIG. 2A, 2B, since the interior space 31 of the first bellows part 16 communicates with the interior space 101 of the high-pressure vessel 2, a force arising from a pressure in the high-pressure vessel 2 acts on the surface 13 of the movable part 12, pushing the movable part 12 and the shaft 4 out of the interior space 101 toward the low-pressure exterior space 102 of the vessel 2. On the other hand, since the pressure having the same magnitude as the interior space 31 of the first bellows part 16 (that is, the pressure equal to the pressure in the vessel 2) is introduced to the interior space 32 of the second bellows part 18, due to the said pressure, a force opposite to the force acting on the surface 13 acts on the surface 14 of the movable part 12. Thus, it is possible to at least partially cancel the force to push out the shaft 4 (the force acting on the surface 13) described above.

Moreover, with the above configuration, when the shaft 4 is moved by the drive part 8 (see FIG. 1) and the like, it is possible to maintain a difference in magnitude between the forces acting on the both surfaces 13, 14 of the movable part 12, respectively, small and constant without actively controlling the pressure.

Thus, according to the sealing device 10 of the above-described embodiments, with the simple configuration where the first bellows part 16 and the second bellows part 18 communicate with each other via the communication path 22, it is possible to suppress displacement of the shaft 4 (such as pushing-out of the shaft 4) due to the differential pressure described above while reliably sealing the penetrated portion 3 of the vessel 2 by the shaft 4, and to appropriately drive the shaft 4 while reducing the driving force to the shaft 4.

Moreover, in the sealing device 10 shown in FIG. 2A, 2B, since the interior space 31 of the first bellows part 16 communicates with the interior space 101 of the vessel 2, and the first bellows part 16, the second bellows part 18, and the movable part 12 are disposed on the outer side of the vessel 2, assembly of the sealing device 10 to the vessel 2 or maintenance of the sealing device 10 is relatively easy.

The first bellows part 16, the second bellows part 18, and the movable part 12 may be configured such that a pressure-receiving area of the movable part 12 in the interior space 31 of the first bellows part 16 and a pressure-receiving area of the movable part 12 in the interior space 32 of the second bellows part 18 are equal to each other.

The pressure-receiving area of the movable part 12 in the interior space 31 of the first bellows part 16 is an area of the surface 13 on a plane (projection plane) orthogonal to the axial direction when the surface 13 of the movable part 12 exposed to the interior space 31 is projected on the projection plane. Moreover, the pressure-receiving area of the movable part 12 in the interior space 32 of the second bellows part 18 is an area of the surface 14 on a plane (projection plane) orthogonal to the axial direction when the surface 14 of the movable part 12 exposed to the interior space 32 is projected on the projection plane.

Thus making the pressure-receiving areas on the both sides (that is, the side of the first bellows part 16 and the side of the second bellows part 18) of the movable part 12 equal to each other, it is possible to cancel the force of pushing the shaft 4 by the differential pressure between the interior space 101 and the exterior space 102 of the vessel 2, and even if the shaft 4 (and the movable part 12) is moved, it is possible to eliminate the difference in magnitude between the forces acting on the both surfaces (the surface 13 and the surface 14) of the movable part 12 without actively controlling the pressure. Thus, with the simple configuration, it is possible to suppress displacement of the shaft 4 (such as pushing-out of the shaft 4) due to the differential pressure described above more effectively, and to appropriately drive the shaft 4 while reducing the driving force to the shaft 4.

In the sealing device 10 shown in FIG. 2A, the driving force from the drive part 8 is applied to, of the first shaft part 5 and the second shaft part 6, the second shaft part 6 disposed on the outer side of the vessel 2, and the driving force applied to the second shaft part 6 is transmitted to the first shaft part 5 via the movable part 12.

Thus applying the driving force to the second shaft part 6, the driving force is transmitted to the first shaft part 5, making it possible to appropriately drive the shaft 4 (the first shaft part 5 and the second shaft part 6).

The first shaft part 5 and the second shaft part 6 constituting the shaft 4 may coaxially be disposed. In this case, it is possible to smoothly transmit, to the first shaft part 5, the driving force from the drive part 8 (see FIG. 1) and the like applied to one of the second shaft part 6.

The sealing device 10 shown in FIG. 2A, 2B further includes a link 34 which extends beyond the second bellows part 18 in the axial direction, is connected at one end 35 to the movable part 12, and is connected at another end 36 to the second shaft part 6.

Thus connecting the movable part 12 and the second shaft part 6 via the link 34, it is possible to appropriately drive the shaft 4 (the first shaft part 5 and the second shaft part 6) via the movable part 12 by applying the driving force to the second shaft part 6 with the drive part 8 (see FIG. 1) and the like. Moreover, since the first shaft part 5 and the second shaft part 6 are, respectively, disposed on both sides of the link 34 extending beyond the second bellows part 18 in the axial direction, the shaft 4 (the first shaft part 5 and the second shaft part 6) does not exist in the extension region of the second bellows part 18 in the axial direction. Thus, it is possible to simplify the structure of the second bellows part 18. Accordingly, it is possible to easily adjust the pressure-receiving area of the movable part 12 on the side of the second bellows part 18.

Next, with reference to FIGS. 2A to 10, the sealing device 10 according to some embodiments will be described. Description of the same configuration as the embodiment shown in FIG. 2A, 2B may be omitted.

As with the embodiment shown in FIG. 2A, 2B, in the exemplary embodiments shown in FIGS. 3 to 9, the shaft 4 includes the first shaft part 5 penetrating the wall of the vessel 2 and connected to the movable part 12, and the second shaft part 6 located opposite to the first shaft part 5 across the movable part 12. In the exemplary embodiments shown in FIGS. 2A to 5, the movable part 12 is fixed to one end of the first shaft part 5 penetrating the wall of the vessel 2 on the outer side of the vessel 2. In the exemplary embodiments shown in FIGS. 6 to 9, the movable part 12 is fixed to one end of the first shaft part 5 penetrating the wall of the vessel 2 on the inner side of the vessel 2.

The first bellows part 16 has the first end 16a and the second end 16b. The first end 16a is disposed around the shaft 4 (more specifically, the first shaft part 5) between the vessel 2 and the movable part 12 in the axial direction, and the second end 16b is fixed to the movable part 12. The interior space 31 of the first bellows part 16 communicates with the space opposite to the first bellows part 16 across the penetrated portion 3 of the vessel 2 by the shaft 4. That is, in the exemplary embodiments shown in FIGS. 2A to 5, the interior space 31 of the first bellows part 16 communicates with the interior space 101 of the vessel 2. Moreover, in the exemplary embodiments shown in FIGS. 6 to 9, the interior space 31 of the first bellows part 16 communicates with the exterior space 102 of the vessel 2.

The second bellows part 18 is disposed opposite to the first bellows part 16 across the movable part 12, and has the first end 18a and the second end 18b. The first end 18a is disposed on the side of the first bellows part 16 and fixed to the movable part 12, and the second end 18b is fixed to the stationary member 20. The stationary member 20 to which the second end 18b of the second bellows part 18 is fixed is not particularly limited, as long as the stationary member 20 is stationary with respect to the vessel 2. The stationary member 20 may be, for example, the member connected and fixed to the outer wall or the like of the vessel 2. In some embodiments, as shown in FIG. 2B, the stationary member 20 is fixed to the vessel 2.

That is, the first end 16a of the first bellows part 16 and the second end 18b of the second bellows part 18 are fixed to the member stationary with respect to the vessel 2 (the vessel 2 or the member fixed thereto), and the second end 16b of the first bellows part 16 and the first end 18a of the second bellows part 18 are fixed to the movable part 12. Thus, while the total length of the bellows including the first bellows part 16 and the second bellows part 18 is unchanged (constant), the first bellows part 16 and the second bellows part 18 are expandable along the axial direction along with movement in the axial direction of the shaft 4 and the movable part 12.

Figure 3:
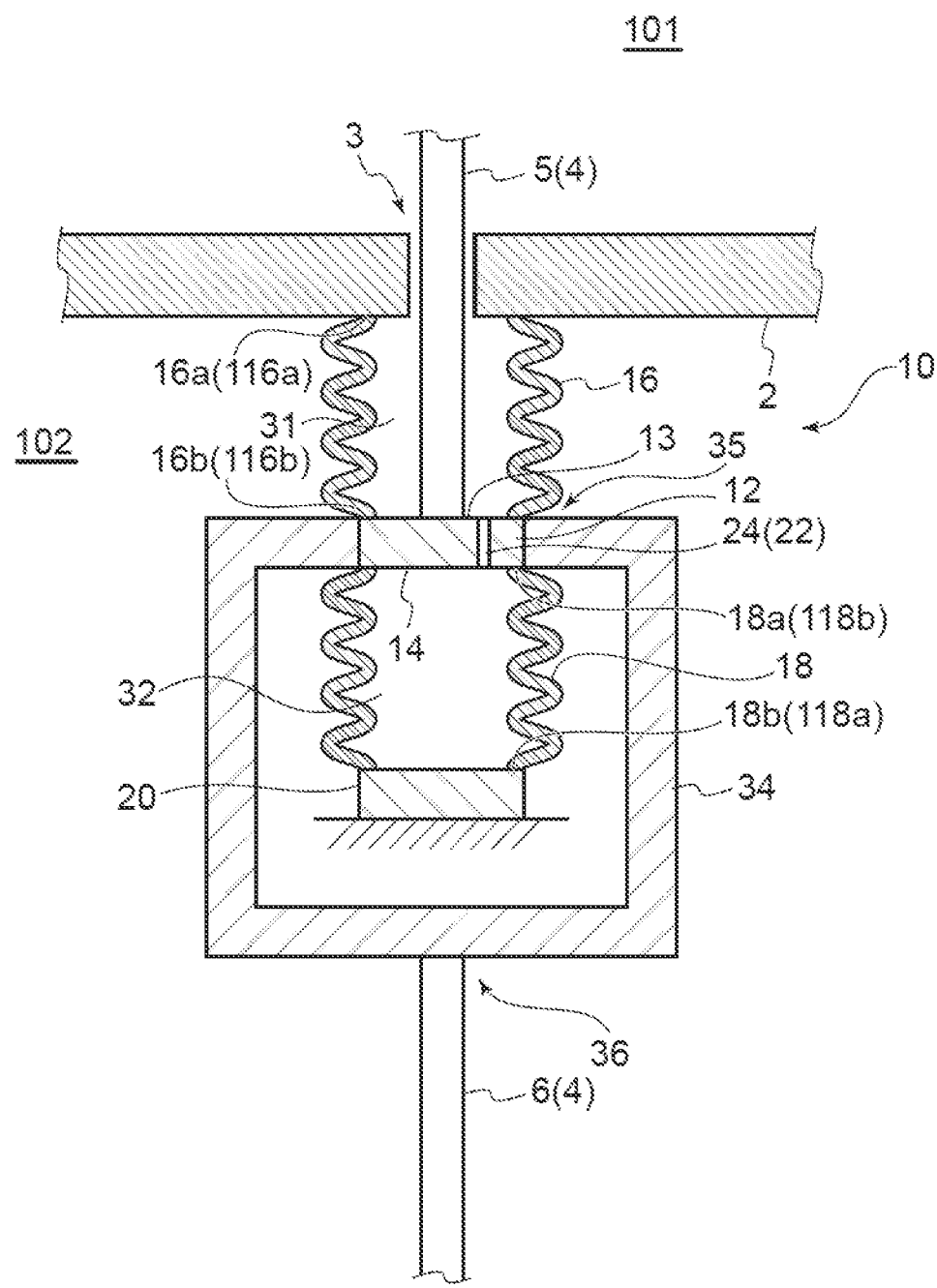
FIG. 3 is a schematic view of the sealing device according to an embodiment.
Figure 6:
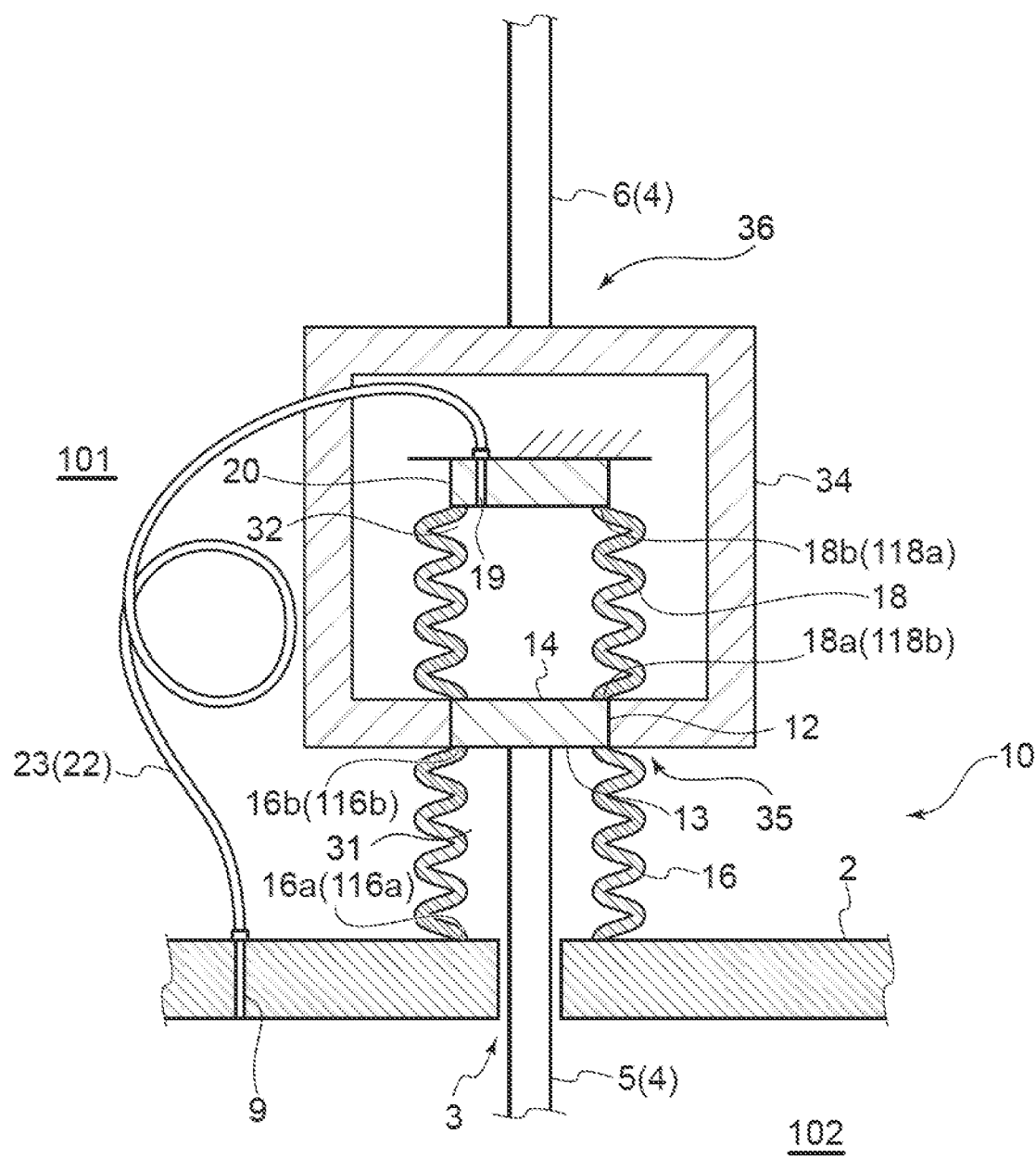
FIG. 6 is a schematic view of the sealing device according to an embodiment.
Figure 7:
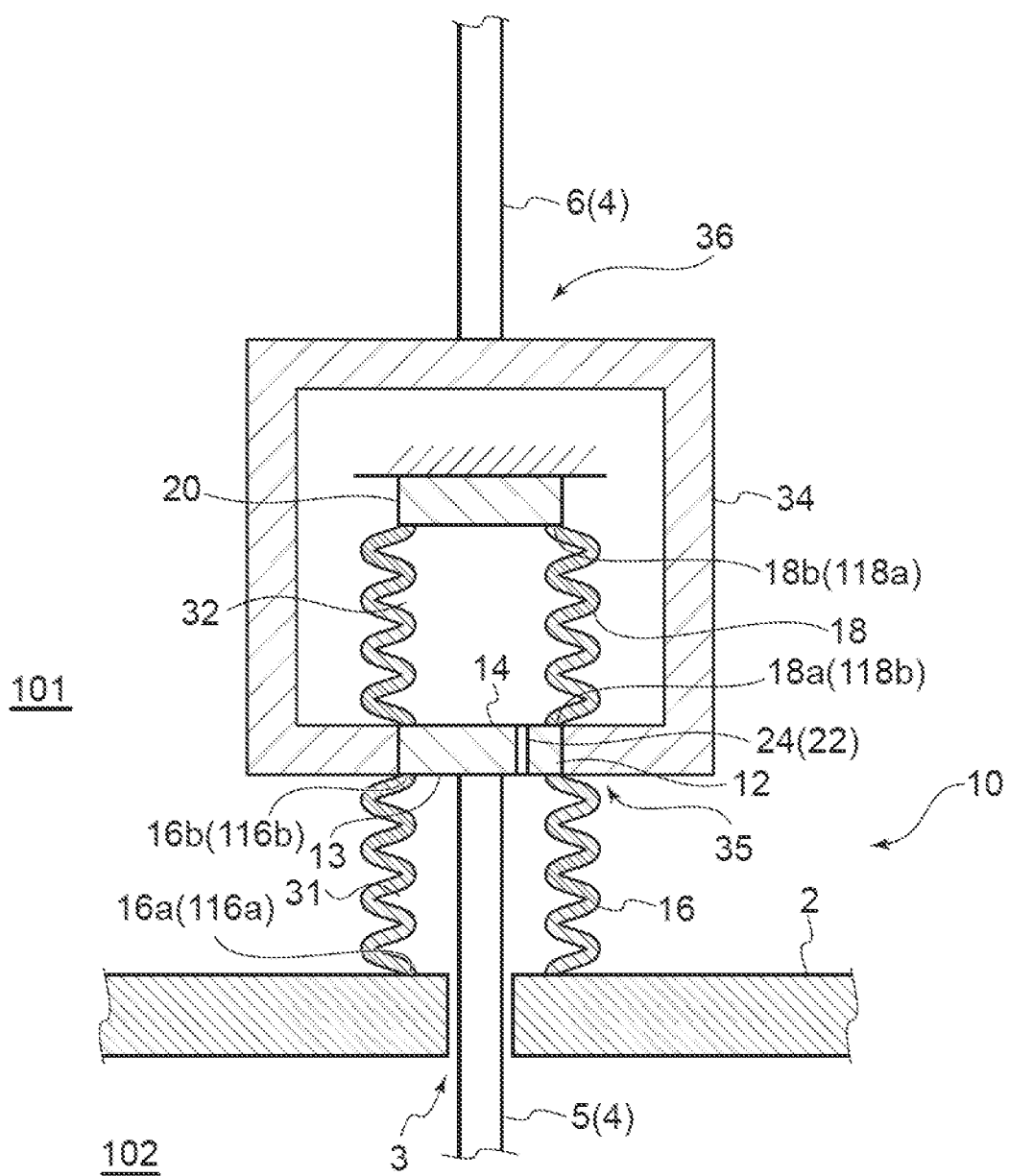
FIG. 7 is a schematic view of the sealing device according to an embodiment.
Figure 8:
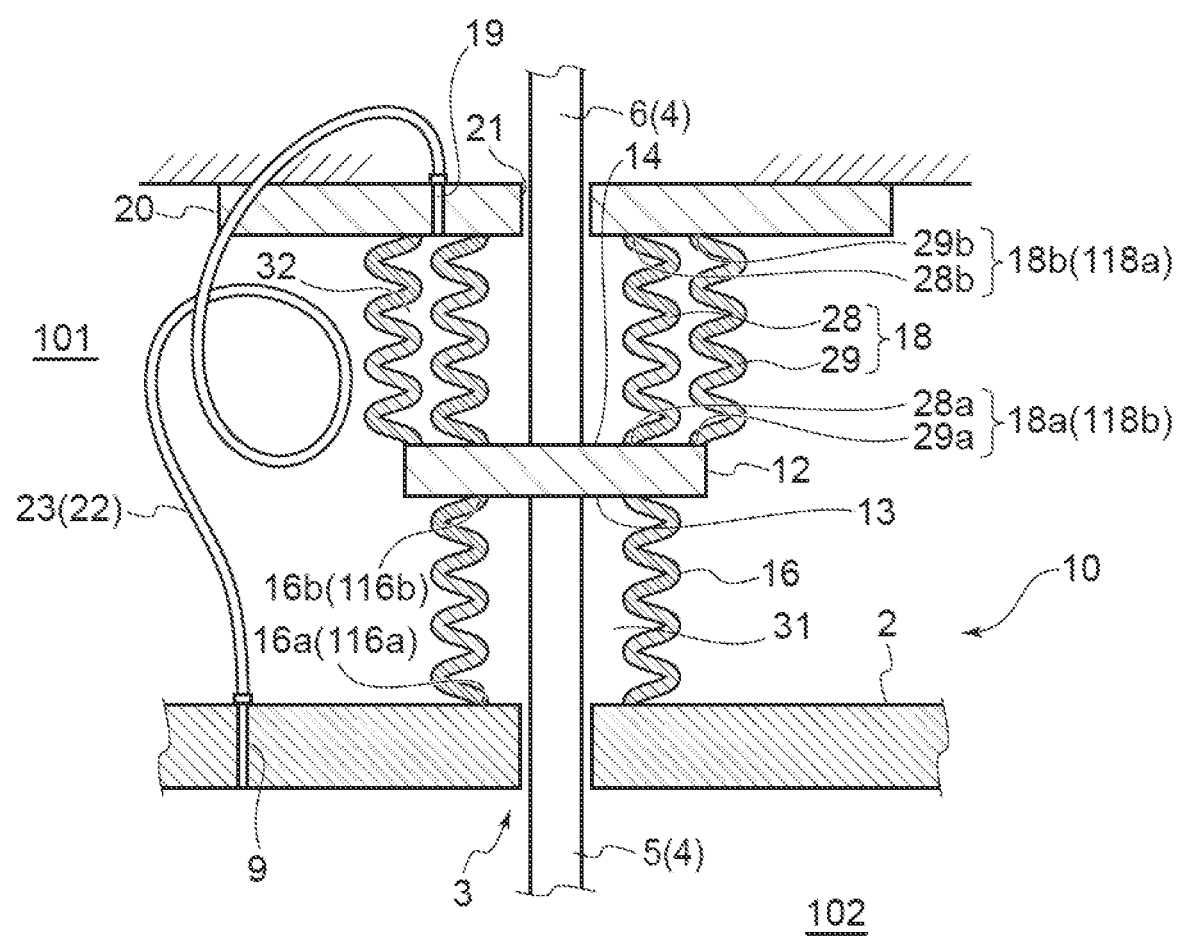
FIG. 8 is a schematic view of the sealing device according to an embodiment.
Figure 9:
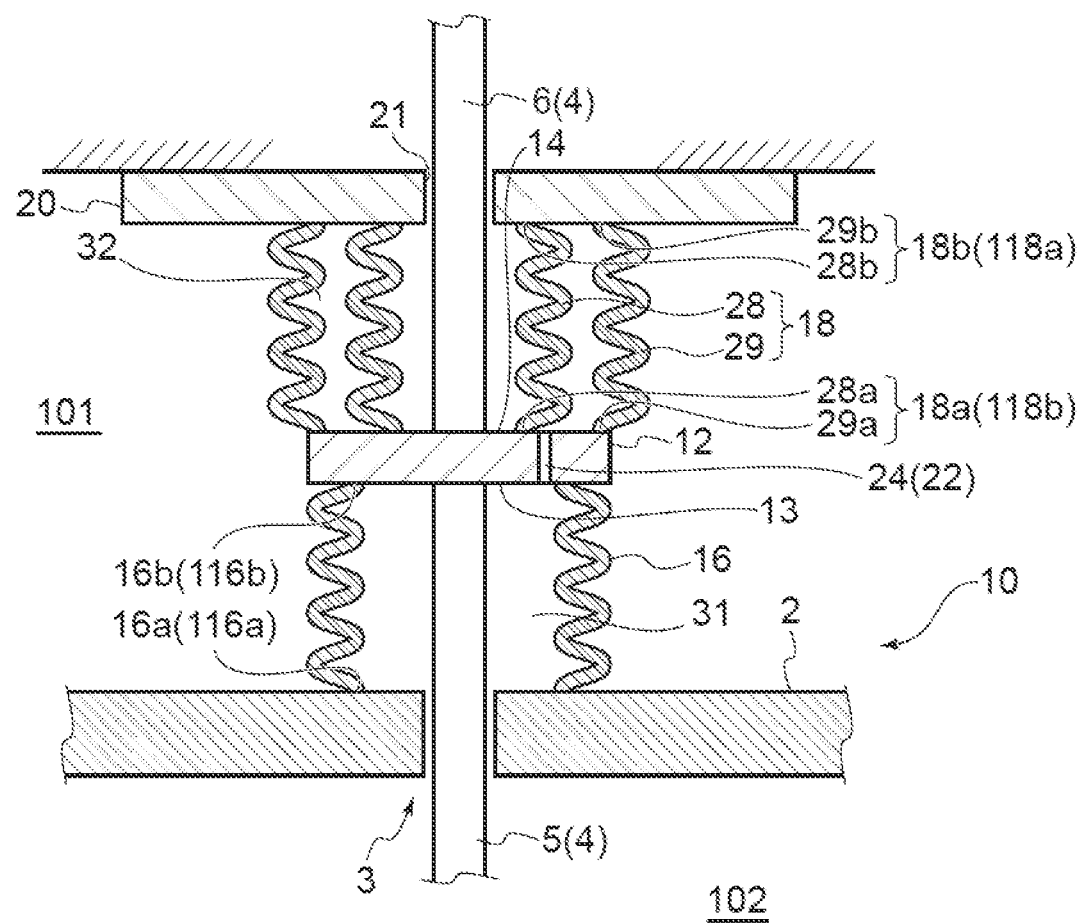
FIG. 9 is a schematic view of the sealing device according to an embodiment.

In the embodiments shown in FIGS. 3, 6, and 7, as with the embodiment shown in FIG. 2A, 2B, the second bellows part 18 has the single bellows structure, and the interior space 32 of the second bellows part 18 is the radially inner space of the second bellows part 18.

In the exemplary embodiments shown in FIGS. 4, 5, 8, and 9, the second bellows part 18 has a double bellows structure which includes an inner bellows part 28 disposed on the radially outer side of the second shaft part 6 and an outer bellows part 29 disposed on the radially outer side of the inner bellows part 28. The interior space 32 of the second bellows part 18 is an annular space formed between the inner bellows part 28 and the outer bellows part 29. The inner bellows part 28 has one end 28a fixed to the movable part 12 and another end 28b fixed to the stationary member 20. The outer bellows part 29 has one end 29a fixed to the movable part 12 and another end 29b fixed to the stationary member 20. The first end 18a of the inner bellows part 28 includes the one ends 28a, 29a of the inner bellows part 28 and the outer bellows part 29, and the second end 18b of the inner bellows part 28 includes the another ends 28b, 29b of the inner bellows part 28 and the outer bellows part 29.

The sealing device 10 further includes the communication path 22 for causing the interior space 31 of the first bellows part 16 and the interior space 32 of the second bellows part 18 to communicate with each other. Thus causing the interior space 31 of the first bellows part 16 and the interior space 32 of the second bellows part 18 to communicate with each other via the communication path 22, the pressure of the same magnitude is introduced to these interior spaces 31, 32. That is, the pressure of the same magnitude acts on, of the movable part 12, the surface 13 exposed to the interior space 31 of the first bellows part 16 and the surface 14 exposed to the interior space 32 of the second bellows part 18.

For example, as shown in FIGS. 2A, 4, 6, and 8, the communication path 22 may include the communication pipe 23 for connecting the interior space 32 of the second bellows part 18 and a space communicating with the first bellows part 16, via outside of the first bellows part 16 and the second bellows part 18.

Figure 4:
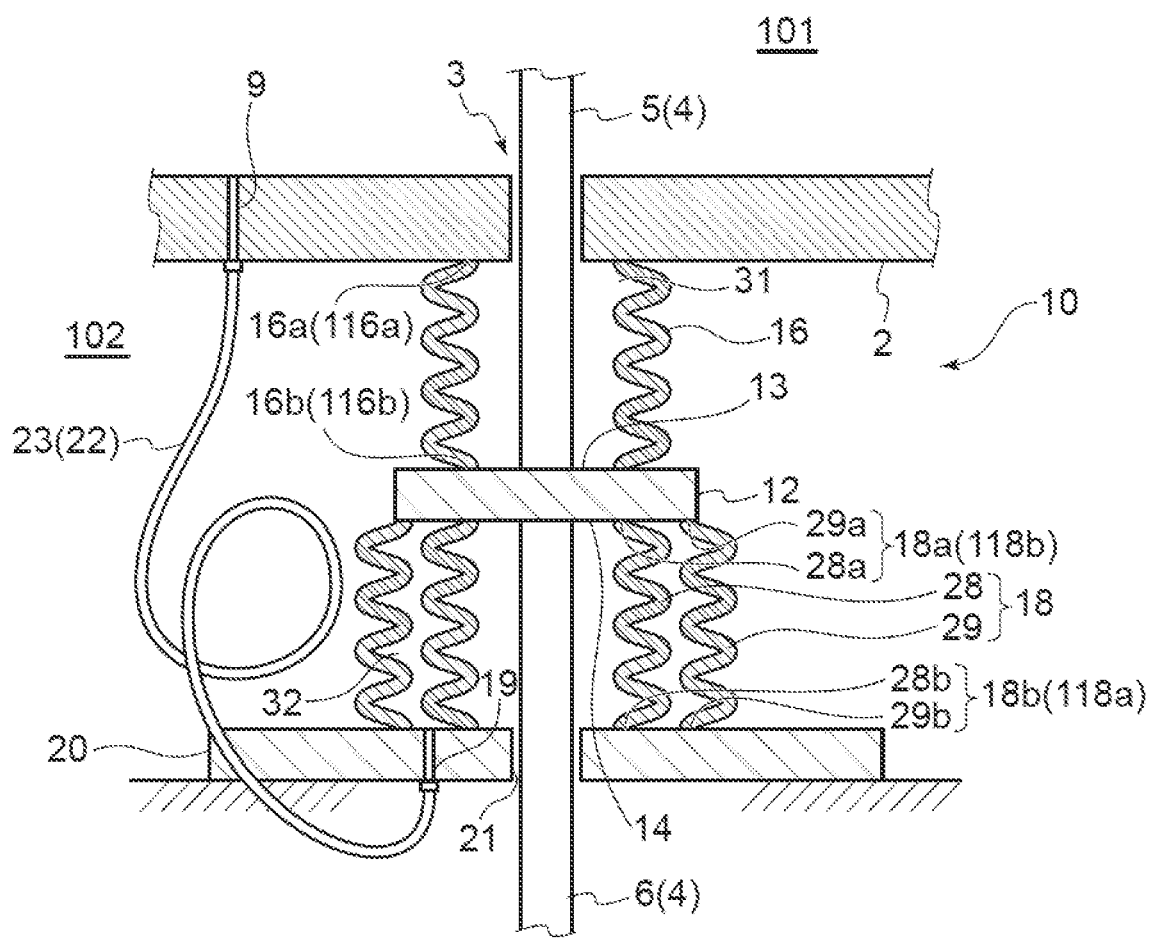
FIG. 4 is a schematic view of the sealing device according to an embodiment.
Figure 5:
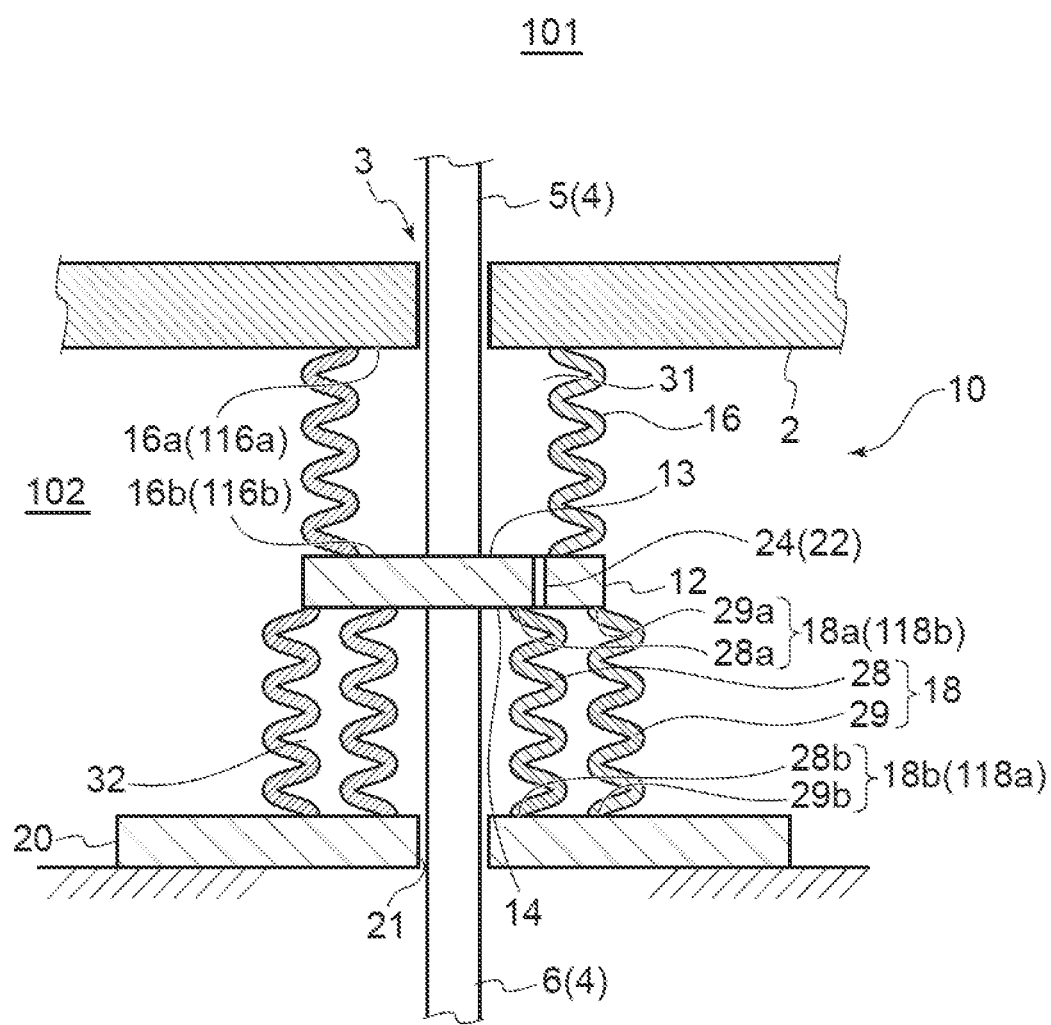
FIG. 5 is a schematic view of the sealing device according to an embodiment.

In the exemplary embodiments shown in FIGS. 2A and 4, the communication pipe 23 is disposed so as to connect the interior space 32 of the second bellows part 18 and the interior space 101 of the vessel 2 (the space communicating with the interior space 31 of the first bellows part 16) via a through hole 19 disposed in the stationary member 20 and a through hole 9 disposed in the vessel 2. Moreover, in the exemplary embodiments shown in FIGS. 6 and 8, the communication pipe 23 is disposed so as to connect the interior space 32 of the second bellows part 18 and the exterior space 102 of the vessel 2 (the space communicating with the interior space 31 of the first bellows part 16) via the through hole 19 disposed in the stationary member 20 and the through hole 9 disposed in the vessel 2.

Alternatively, for example, as shown in FIGS. 3, 5, 7, and 9, the communication path 22 may include a through hole 24 which is disposed in the movable part 12, and has one end opening to the interior space 31 of the first bellows part 16 and another end opening to the 32 interior space of the second bellows part 18.

In the sealing device 10 described above, the total length of the bellows including the second bellows part 18 and the first bellows part 16 for sealing the penetrated portion 3 of the vessel 2 by the shaft 4 is constrained by fixing the both ends (the first end 16a of the first the first bellows part 16 and the second end 18b of the second bellows part 18) of the bellows to the vessel 2 and the stationary member 20, as well as the above-described movable part 12 is disposed between the first bellows part 16 and the second bellows part 18, and the interior space 31 of the first bellows part 16 and the interior space 32 of the second bellows part 18 are caused to communicate with each other.

With the above configuration, it is possible to suppress the pressure fluctuation in the vessel 2 due to movement of the shaft 4 and the movable part 12 in the axial direction, and to cause the pressure of the same magnitude to act on the both surfaces (the surface 13 exposed to the interior space 31 of the first bellows part 16 and the surface 14 exposed to the interior space 32 of the second bellows part 18) of the movable part 12. Therefore, it is possible to at least partially cancel the force of pushing the shaft 4 by the differential pressure between the interior space 101 and the exterior space 102 of the vessel 2.

Moreover, with the above configuration, when the shaft 4 is moved by the drive part 8 (see FIG. 1) and the like, it is possible to maintain the difference in magnitude between the forces acting on the both surfaces 13, 14 of the movable part 12, respectively, small and constant without actively controlling the pressure.

Thus, according to the sealing device 10 of the above-described embodiments, with the simple configuration where the first bellows part 16 and the second bellows part 18 communicate with each other via the communication path 22, it is possible to suppress displacement of the shaft 4 (such as pushing-out of the shaft 4) due to the differential pressure described above while reliably sealing the penetrated portion 3 of the vessel 2 by the shaft 4, and to appropriately drive the shaft 4 while reducing the driving force to the shaft 4.

Moreover, in the embodiments (for example, the embodiments shown in FIGS. 2A to 5) where the interior space 31 of the first bellows part 16 communicates with the interior space 101 of the vessel 2, since the first bellows part 16, the second bellows part 18, and the movable part 12 are disposed on the outer side of the vessel 2, assembly of the sealing device 10 to the vessel 2 or maintenance of the sealing device 10 is relatively easy.

Moreover, in the embodiments (for example, the embodiments shown in FIGS. 6 to 9) where the interior space 31 of the first bellows part 16 communicates with the exterior space 102 of the vessel 2, since the first bellows part 16, the second bellows part 18, and the movable part 12 are disposed on the inner side of the vessel 2, it is possible to save an installation space of the sealing device 10.

In some embodiments, the pressure-receiving area of the movable part 12 in the interior space 31 of the first bellows part 16 and the pressure-receiving area of the movable part 12 in the interior space 32 of the second bellows part 18 are equal to each other.

Thus making the pressure-receiving areas on the both sides (that is, the side of the first bellows part 16 and the side of the second bellows part 18) of the movable part 12 equal to each other, it is possible to cancel the force of pushing the shaft 4 by the differential pressure between the interior space 101 and the exterior space 102 of the vessel 2, and even if the shaft 4 (and the movable part 12) is moved, it is possible to eliminate the difference in magnitude between the forces acting on the both surfaces (the surface 13 and the surface 14) of the movable part 12 without actively controlling the pressure. Thus, with the simple configuration, it is possible to suppress displacement of the shaft 4 (such as pushing-out of the shaft 4) due to the differential pressure described above more effectively, and to appropriately drive the shaft 4 while reducing the driving force to the shaft 4.

In some embodiments, the sealing device 10 is configured such that a driving force in the axial direction is applied to one of the first shaft part 5 or the second shaft part 6 constituting the shaft 4. In addition, the sealing device 10 is configured such that the driving force from the second shaft part 6 or the first shaft part is transmitted via the movable part 12 to the other of the first shaft part 5 or the second shaft part 6. Typically, the driving force from the drive part 8 (see FIG. 1) is applied to one of the first shaft part 5 or the second shaft part 6 disposed on the outer side of the vessel 2.

In the exemplary embodiments shown in FIGS. 2A to 5, the driving force from the drive part 8 is applied to, of the first shaft part 5 and the second shaft part 6, the second shaft part 6 disposed on the outer side of the vessel 2, and the driving force applied to the second shaft part 6 is transmitted to the first shaft part 5 via the movable part 12. Moreover, in the exemplary embodiments shown in FIGS. 6 to 9, the driving force from the drive part 8 is applied to, of the first shaft part 5 and the second shaft part 6, the first shaft part 5 disposed on the outer side of the vessel 2, and the driving force applied to the first shaft part 5 is transmitted to the second shaft part 6 via the movable part 12.

Thus applying the driving force to one of the first shaft part 5 or the second shaft part 6, the driving force is transmitted to the other of the first shaft part 5 or the second shaft part 6, making it possible to appropriately drive the shaft 4 (the first shaft part 5 and the second shaft part 6).

The first shaft part 5 and the second shaft part 6 constituting the shaft 4 may coaxially be disposed. In this case, it is possible to smoothly transmit the driving force from the drive part 8 (see FIG. 1) and the like applied to one of the first shaft part 5 or the second shaft part 6 to the other of the first shaft part 5 or the second shaft part 6.

In the exemplary embodiments shown in FIGS. 2A, 2B, 3, 6, and 7, the sealing device 10 further includes the link 34 which extends beyond the second bellows part 18 in the axial direction, is connected at the one end 35 to the movable part 12, and is connected at the another end 36 to the second shaft part 6.

In the above-described embodiments, since the movable part 12 and the second shaft part 6 are connected via the link 34, it is possible to appropriately drive the shaft 4 (the first shaft part 5 and the second shaft part 6) via the movable part 12 by applying the driving force to the first shaft part 5 or the second shaft part 6 with the drive part 8 (see FIG. 1) and the like. Moreover, since the first shaft part 5 and the second shaft part 6 are, respectively, disposed on both sides of the link 34 extending beyond the second bellows part 18 in the axial direction, the shaft 4 (the first shaft part 5 and the second shaft part 6) does not exist in the extension region of the second bellows part 18 in the axial direction. Thus, it is possible to simplify the structure of the second bellows part 18. Accordingly, it is possible to easily adjust the pressure-receiving area of the movable part 12 on the side of the second bellows part 18.

In the exemplary embodiments shown in FIGS. 4, 5, 8, and 9, as described above, the second bellows part 18 has the double bellows structure which includes the inner bellows part 28 and the outer bellows part 29. Moreover, the second shaft part 6 is connected to the movable part 12 on a side opposite to the first shaft part 5. The inner bellows part 28 constituting the second bellows part 18 is disposed on the radially outer side of the second shaft part 6. A through hole 21 is disposed in the stationary member 20 where the second end 18b of the second bellows part 18 (that is, the another ends 28b, 29b of the inner bellows part 28 and the outer bellows part 29) is fixed, and the second shaft part 6 is disposed so as to penetrate the through hole 21 of the stationary member 20.

In the above-described embodiments, since the second bellows part 18 has the double bellows structure including the inner bellows part 28 and the outer bellows part 29, it is possible to directly connect the second shaft part 6 to the movable part 12 on the inner side of the double bellows structure. Thus, it is possible to connect the first shaft part 5 and the second shaft part 6 to the both sides (the side of the first bellows part 16 and the side of the second bellows side 18) of the movable part 12, respectively, and an intermediate member such as the link 34 in the embodiment shown in FIG. 2A and the like need not be provided, making it possible to simplify the structure of the sealing device 10. Moreover, since the first shaft part 5 and the second shaft part 6 are connected via the movable part 12, it is possible to appropriately drive the shaft 4 (the first shaft part 5 and the second shaft part 6) by applying the driving force to the first shaft part 5 or the second shaft part 6.

Furthermore, the sealing device 10 shown in FIGS. 2A to 10 has characteristics to be described below.

In the exemplary embodiments shown in FIGS. 2A to 10, the first bellows part 16 has a stationary-side end 116a fixed to the vessel 2 and a movable-side end 116b fixed to the movable part 12. Moreover, the second bellows part 18 is disposed in series with the first bellows part 16 in the axial direction, and has a stationary-side end 118a fixed to the stationary member 20 (for example, a member connected to the vessel 2) and a movable-side end 118b fixed to the movable part 12. Moreover, among the stationary-side end 116a and the movable-side end 116b of the first bellows part 16 and the stationary-side end 118a and the movable-side end 118b of the second bellows part 18, a distance in the axial direction between the stationary-side ends 116a, 118a or between the movable-side ends 116b, 118b located farthest from each other in the axial direction is constant regardless of a position of the shaft 4 in the axial direction (that is, even if the shaft 4 is moved in the axial direction). Then, the interior space 31 of the first bellows part 16 and the interior space 32 of the second bellows part 18 communicate with each other.

The first bellows part 16 and the second bellows part 18 "are disposed in series" means that the first bellows part 16 and the second bellows part 18 are disposed coaxially. In this case, a direction in which the first bellows part 16 and the second bellows part 18 expand/contract is along the axial direction.

In the exemplary embodiments shown in FIGS. 2A to 9, the stationary-side end 116a of the first bellows part 16 is fixed to the vessel 2, and the stationary-side end 118a of the second bellows part 18 is fixed to the stationary member 20. Moreover, the movable-side end 116b of the first bellows part 16 and the movable-side end 118b of the second bellows part 18 are located between the stationary-side end 116a of the first bellows part 16 and the stationary-side end 118a of the second bellows part 18 in the axial direction, and are fixed to the movable part 12 which is the same member. Among the both ends (the stationary-side ends 116a, 118a and the movable-side ends 116b, 118b) of the first bellows part 16 and the second bellows part 18, the stationary-side ends 116a, 118a are located farthest from each other in the axial direction are fixed to the member stationary with respect to the vessel 2 (that is, the vessel 2 and the stationary member 20), and thus the distance in the axial direction between these stationary-side ends 116a, 118a is constant regardless of the position of the shaft 4 in the axial direction. Then, as already described, the interior space 31 of the first bellows part 16 and the interior space 32 of the second bellows part 18 communicate with each other via the communication path 22.

Figure 10:
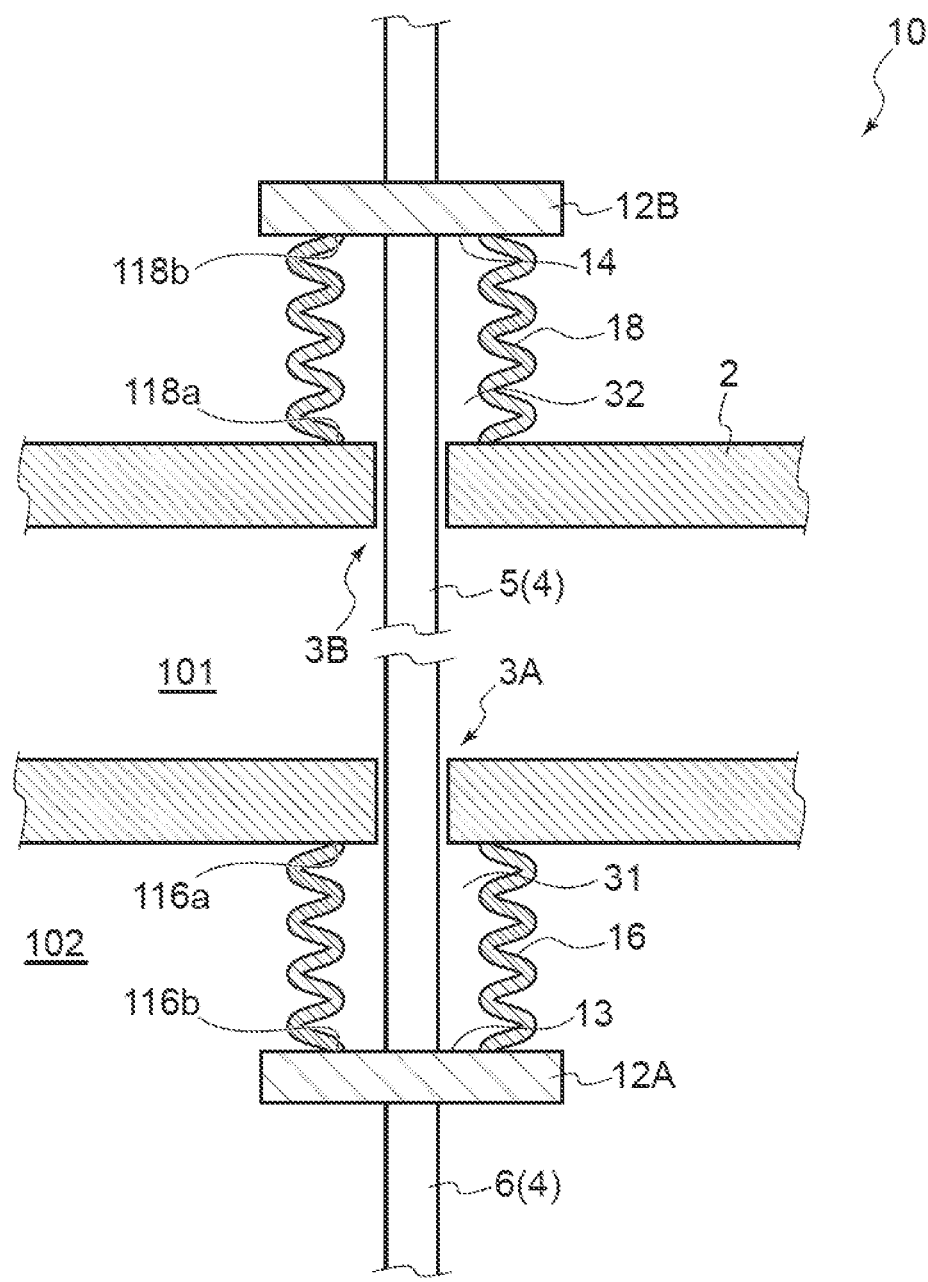
FIG. 10 is a schematic view of the sealing device according to an embodiment.

In the exemplary embodiment shown in FIG. 10, the shaft 4 penetrates the wall of the vessel 2 in a plurality of portions including a first penetrated portion 3A and a second penetrated portion 3B. The movable part 12 includes a first movable member 12A and a second movable member 12B fixed to the first shaft part 5 (shaft 4) at positions on both sides across the vessel 2 in the axial direction, respectively.

The stationary-side end 16a of the first bellows part 16 is fixed to the vessel 2 in the first penetrated portion 3A, and the movable-side end 16b of the first bellows part 16 is fixed to the first movable member 12A. The stationary-side end 18a of the second bellows part 18 is fixed to the vessel 2 (stationary member) in the second penetrated portion 3B, and the movable-side end 18b of the second bellows part 18 is fixed to the second movable member 12B. Among the both ends (the stationary-side ends 116a, 118a and the movable-side ends 116b, 118b) of the first bellows part 16 and the second bellows part 18, the movable-side ends 116b, 118b are located farthest from each other in the axial direction are fixed to the member stationary with respect to the vessel 2 (that is, the vessel 2 and the stationary member 20), and thus the distance in the axial direction between these stationary-side ends 116a, 118b is constant regardless of the position of the shaft 4 in the axial direction.

Moreover, both of the first movable member 12A and the second movable member 12B to which the movable-side ends 116b, 118b are connected, respectively, are fixed to the shaft 4. Thus, among the stationary-side end 116a and the movable-side end 116b of the first bellows part 16 and the stationary-side end 118a and the movable-side end 118b of the second bellows part 18, the distance in the axial direction between the movable-side ends 116b, 118b located farthest from each other in the axial direction is constant regardless of the position of the shaft 4 in the axial direction. Then, the interior space 31 of the first bellows part 16 and the interior space 32 of the second bellows part 18 communicate with each other via a gap between the shaft 4 and the penetrated portion (the first penetrated portion 3A and the second penetrated portion 3B) of the vessel 2, and the interior space 101 of the vessel 2.

According to the configuration of the embodiments shown in FIGS. 2A to 10 described above, the axial distance between the both ends (between the stationary-side ends 116a, 118a or between the movable-side ends 116b, 118b farthest from each other) of the bellows including the first bellows part 16 and the second bellows part 18 is constant, as well as one end portion (stationary-side end) of each of the first bellows part 16 and the second bellows part 18 is fixed to the stationary part (such as the vessel 2), another end portion (movable-side end) is fixed to the movable member 12, and the interior space 31 of the first bellows part 16 and the interior space 32 of the second bellows part 18 are caused to communicate with each other.

Thus, it is possible to move the shaft 4 without changing a total value of the axial length of the first bellows part 16 and the axial length of the second bellows part 18, making it possible to suppress the pressure fluctuation in the vessel due to movement of the shaft 4 and the movable part 12 in the axial direction, and to cause the pressure of the same magnitude to act on the surfaces 13, 14 of the movable part 12 to which the first bellows part 16 and the second bellows part 18 are fixed. Therefore, it is possible to at least partially cancel the force of pushing the shaft 4 (for example, the force of pushing the shaft 4 out of the interior space 101 of the high-pressure vessel toward the lower-pressure exterior space 102) by the differential pressure between the interior space 101 and the exterior space 102 of the vessel 2, and when the shaft 4 is moved, it is possible to maintain the difference in magnitude between the forces acting on the surfaces 13, 14 of the movable part 12, respectively, small and constant without actively controlling the pressure.

Thus, according to the above-described configuration, with the simple configuration, it is possible to suppress displacement of the shaft 4 (such as pushing-out of the shaft 4) due to the differential pressure described above while reliably sealing the shaft penetrating portion, and to appropriately drive the shaft 4 while reducing the driving force to the shaft 4.

Embodiments of the present invention were described in detail above, but the present invention is not limited thereto, and also includes an embodiment obtained by modifying the above-described embodiments and an embodiment obtained by combining these embodiments as appropriate.

Further, in the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, an expression of a shape such as a rectangular shape or a cylindrical shape shall not be construed as only the geometrically strict shape, but also includes a shape with unevenness or chamfered corners within the range in which the same effect can be achieved.

As used herein, the expressions "comprising", "including" or "having" one constitutional element is not an exclusive expression that excludes the presence of other constitutional elements.

REFERENCE SIGNS LIST

1 Drive apparatus
2 Vessel
3 Penetrated portion
4 Shaft
5 First shaft part
6 Second shaft part
8 Drive part
9 Through hole
10 Sealing device
12 Movable part
13 Surface
14 Surface
16 First bellows part
16a First end
16b Second end
18 Second bellows part
18a First end
18b Second end
19 Through hole
20 Stationary member
21 Through hole
22 Communication path
23 Communication pipe
24 Through hole
28 Inner bellows part
28a One end
28b Another end
29 Outer bellows part
29a One end
29b Another end
31 Interior space
32 Interior space
34 Link
35 One end
36 Another end
50 Vibration object
52 Support rod
54 Support part
101 Interior space
102 Exterior space

The invention claimed is:

1. A sealing device, comprising:
at least one movable part which is fixed to a shaft penetrating a wall of a vessel and is movable with the shaft, the vessel being configured to include an interior space having a higher pressure or a lower pressure than an exterior space;
a first bellows part which has a stationary-side end fixed to the vessel and a movable-side end fixed to the at least one movable part; and
a second bellows part which is disposed in series with the first bellows part in an axial direction, and has a stationary-side end fixed to a stationary member and a movable-side end fixed to the at least one movable part,
wherein, among the stationary-side end and the movable-side end of the first bellows part and the stationary-side end and the movable-side end of the second bellows part, a distance in the axial direction between the stationary-side ends or between the movable-side ends located farthest from each other in the axial direction is constant regardless of a position of the shaft, and
wherein an interior space of the first bellows part and an interior space of the second bellows part communicate with each other,
wherein the shaft penetrates the wall of the vessel in a plurality of portions including a first penetrated portion and a second penetrated portion,
wherein the at least one movable part includes a first movable member and a second movable member fixed to the shaft at positions on both sides across the vessel in the axial direction, respectively,
wherein the first and second movable members are distinct and separate from each other,
wherein the stationary-side end of the first bellows part is fixed to the vessel in the first penetrated portion, and the movable-side end of the first bellows part is fixed to the first movable member, and
wherein the stationary-side end of the second bellows part is fixed to the vessel in the second penetrated portion, and the movable-side end of the second bellows part is fixed to the second movable member.

2. A drive apparatus, comprising:
a shaft which penetrates a wall of a vessel configured to include an interior space having a higher pressure or a lower pressure than an exterior space;
the sealing device according to claim 1 configured to seal a penetrated portion of the vessel by the shaft; and
a drive part configured to apply a driving force in an axial direction to the shaft via the sealing device.

* * * * *